United States Patent
Fujita

(10) Patent No.: US 10,823,957 B2
(45) Date of Patent: *Nov. 3, 2020

(54) PROJECTION DISPLAY DEVICE, AND OPERATION METHOD AND OPERATION PROGRAM FOR PROJECTION DISPLAY DEVICE

(71) Applicant: FUJIFILM Corporation, Tokyo (JP)

(72) Inventor: Kodai Fujita, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/355,862

(22) Filed: Mar. 18, 2019

(65) Prior Publication Data

US 2019/0212550 A1    Jul. 11, 2019

Related U.S. Application Data

(63) Continuation of application No. PCT/JP2017/032622, filed on Sep. 11, 2017.

(30) Foreign Application Priority Data

Sep. 28, 2016   (JP) .................................. 2016-189401

(51) Int. Cl.
*G02B 27/00* (2006.01)
*G02B 27/01* (2006.01)
(Continued)

(52) U.S. Cl.
CPC .......... *G02B 27/0006* (2013.01); *B60K 35/00* (2013.01); *G02B 27/0149* (2013.01);
(Continued)

(58) Field of Classification Search
CPC ...... B60K 2370/1529; B60K 2370/334; B60K 2370/682; B60K 35/00; G02B 2027/0154;
(Continued)

(56) References Cited

U.S. PATENT DOCUMENTS

| | | |
|---|---|---|
| 5,005,010 A | 4/1991 | Misaki et al. |
| 5,305,011 A | 4/1994 | Furuya et al. |

(Continued)

FOREIGN PATENT DOCUMENTS

| | | |
|---|---|---|
| JP | S63145726 | 9/1988 |
| JP | H04119479 | 10/1992 |

(Continued)

OTHER PUBLICATIONS

"International Search Report (Form PCT/ISA/210) of PCT/JP2017/032622," dated Oct. 17, 2017 with English translation thereof, pp. 1-5.
"Written Opinion of the International Searching Authority (Form PCT/ISA/237) of PCT/JP2017/032622," dated Oct. 17, 2017, with English translation thereof, pp. 1-13.

*Primary Examiner* — Afroza Chowdhury
(74) *Attorney, Agent, or Firm* — JCIPRNET

(57) ABSTRACT

An HUD includes a housing that accommodates a light modulation unit that spatially modulates light emitted by a light source; a projection optical system that is accommodated in the housing and projects the light that has been spatially modulated onto a windshield 2 through an opening portion K of the housing; a cover that closes the opening portion K; a separation member that is movable and is for separating a front surface of the cover into a plurality of regions; a driving unit; and an object detecting unit that detects an object approaching the front surface of the cover. The driving unit moves the separation member to a position on the cover to separate the cover into a plurality of regions when the object detecting unit detects an object, and leaves the separation member retracted from the position on the cover when an object is not detected.

20 Claims, 14 Drawing Sheets

(51) Int. Cl.
  *G09G 3/00* (2006.01)
  *B60K 35/00* (2006.01)
  *G03B 21/14* (2006.01)

(52) U.S. Cl.
  CPC ...... *G09G 3/001* (2013.01); *B60K 2370/1529* (2019.05); *B60K 2370/334* (2019.05); *B60K 2370/682* (2019.05); *G02B 2027/0154* (2013.01); *G03B 21/145* (2013.01); *G09G 2380/10* (2013.01)

(58) Field of Classification Search
  CPC ............ G02B 27/0006; G02B 27/0149; G03B 21/145; G09G 2380/10; G09G 3/001
  See application file for complete search history.

(56) References Cited

U.S. PATENT DOCUMENTS

| | | |
|---|---|---|
| 2008/0049331 A1 | 2/2008 | Nakamura et al. |
| 2015/0309206 A1 | 10/2015 | Kuntze et al. |
| 2019/0204592 A1* | 7/2019 | Fujita ................... B60K 35/00 |

FOREIGN PATENT DOCUMENTS

| | | |
|---|---|---|
| JP | 2003237411 | 8/2003 |
| JP | 2008040091 | 2/2008 |
| JP | 2010188870 | 9/2010 |
| JP | 2015113088 | 6/2015 |
| JP | 2015535206 | 12/2015 |

* cited by examiner

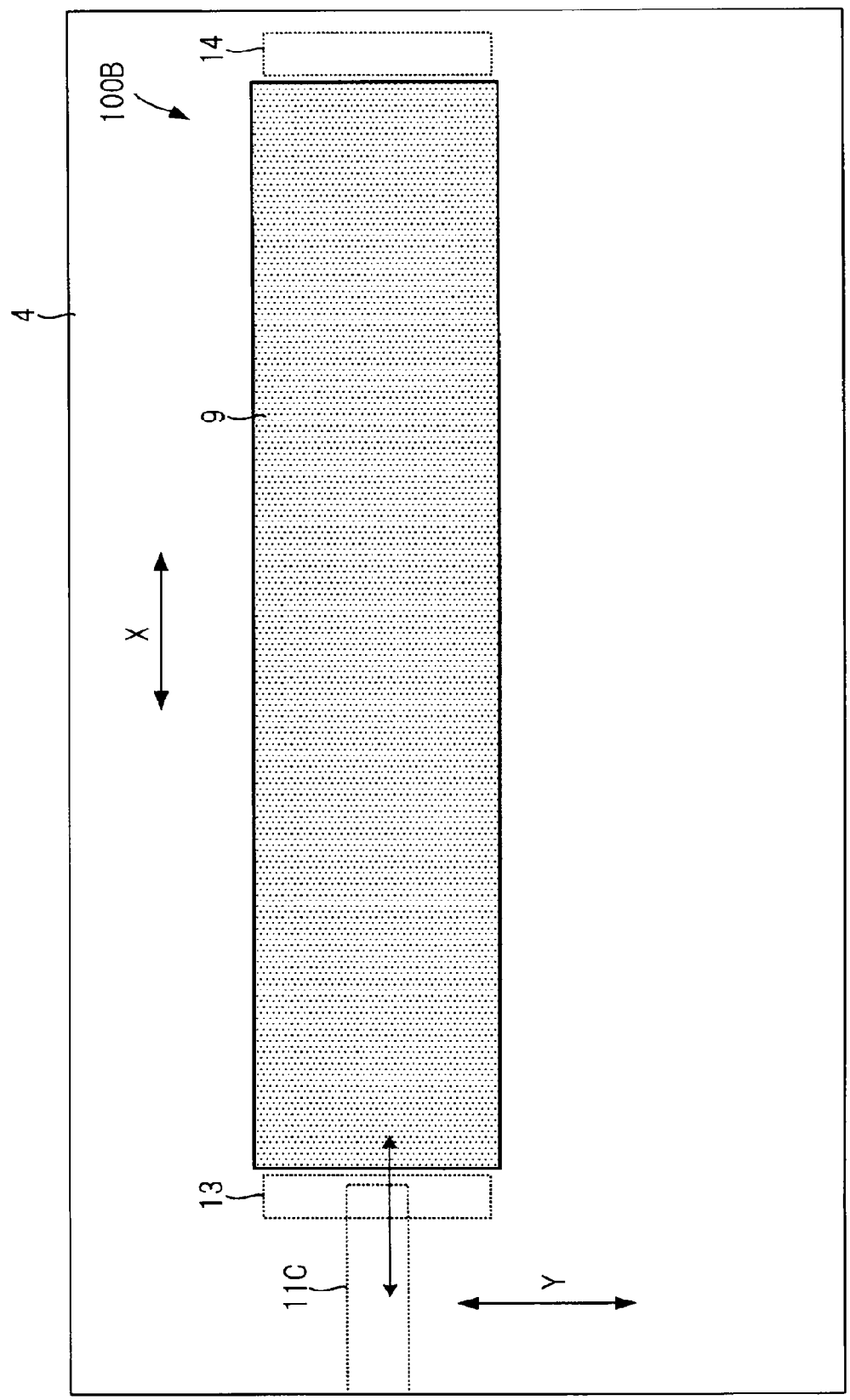

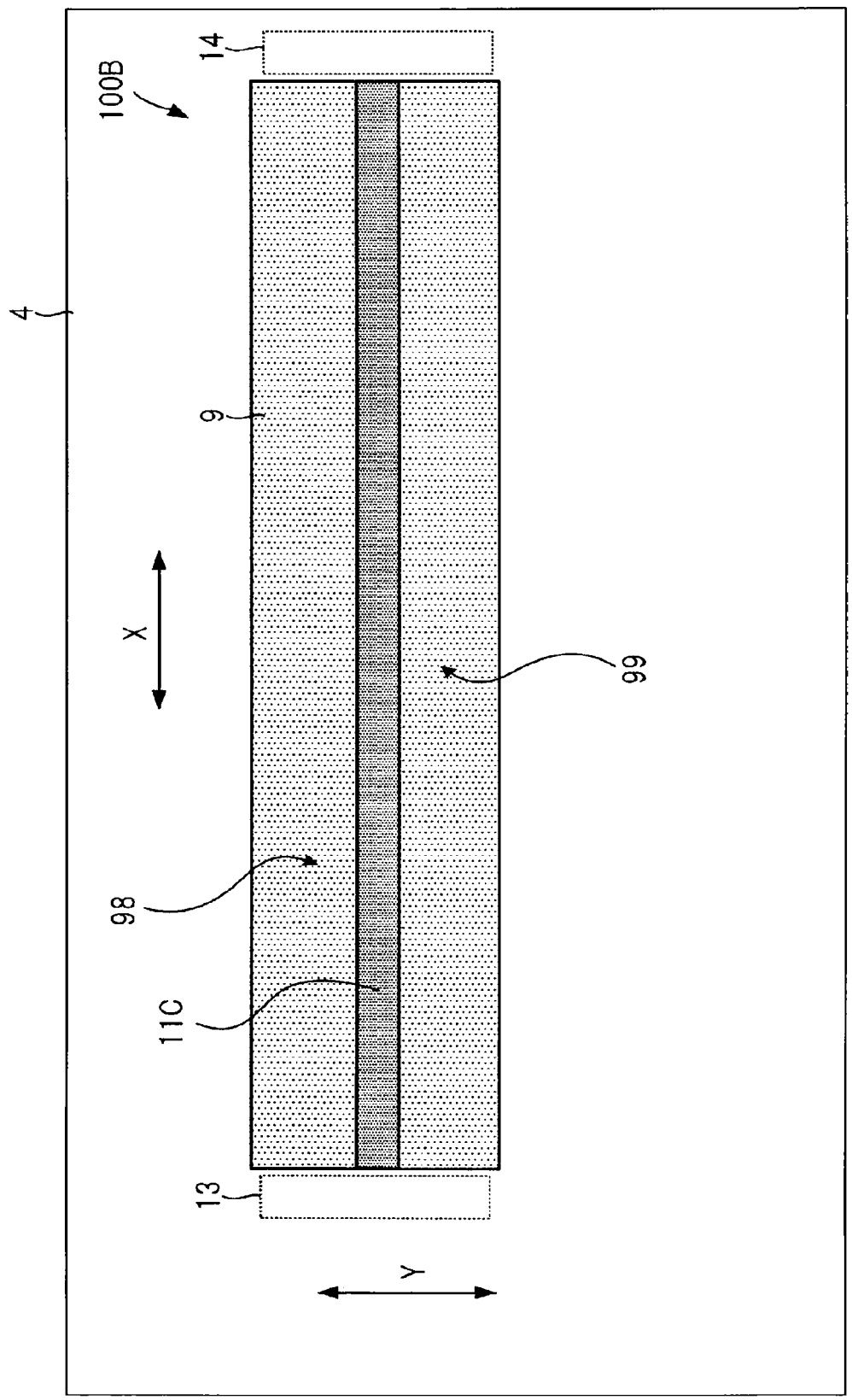

PROJECTION DISPLAY DEVICE, AND OPERATION METHOD AND OPERATION PROGRAM FOR PROJECTION DISPLAY DEVICE

CROSS-REFERENCE TO RELATED APPLICATIONS

This application is a Continuation of PCT International Application No. PCT/JP2017/032622 filed on Sep. 11, 2017, which claims priority under 35 U.S.C § 119(a) to Japanese Patent Application No. 2016-189401 filed on Sep. 28, 2016. Each of the above application(s) is hereby expressly incorporated by reference, in its entirety, into the present application.

BACKGROUND OF THE INVENTION

1. Field of the Invention

The present invention relates to a projection display device, and an operation method and a non-transitory computer readable recording medium storing an operation program for the projection display device.

2. Description of the Related Art

A head-up display (HUD) for a vehicle has been known. In the HUD, a combiner that is disposed on a windshield of a vehicle, such as an automobile, a train, a ship, a heavy machine, an aircraft, or an agricultural machine, or that is disposed near a position before the windshield is used as a screen, and light is projected onto the screen to display an image. The HUD enables a driver to visually recognize an image that is based on light projected from the HUD as a real image on the screen or as a virtual image in front of the screen.

JP2003-237411A discloses an HUD in which an openable/closable shutter portion is provided at an opening portion of a housing, the opening portion serving as a path of image light projected onto a screen, and in which, when not in use, the shutter portion is closed to prevent the entry of direct sunlight or the like into the opening portion.

JP2008-040091A discloses an HUD in which a transparent cover is provided at an opening portion of a housing to prevent the entry of a foreign object into the device.

SUMMARY OF THE INVENTION

An HUD mounted in an automobile is typically built in a dashboard and projects image light onto a windshield or combiner through an opening portion of a housing exposed on an upper surface of the dashboard.

An HUD mounted in an automobile typically has a cover formed of a transparent member and closing an opening portion of a housing to prevent the entry of an object, such as dirt, dust, or liquid, into the opening portion.

If an object falls on the cover, when the object fallen on the cover is liquid, there is a possibility that the liquid is moved on a front surface of the cover to block the most part of projected light, thereby decreasing the visibility of a displayed image. When the object is not liquid, there is a possibility that wind or vibration moves the object on the front surface of the cover and a region hidden by the object in a displayed image consecutively changes, resulting in degradation of display quality.

In the HUD described in JP2003-237411A, the shutter is at a position retracted from the opening portion of the housing when in use, and thus it is impossible to prevent falling of an object into the opening portion of the housing. Assuming that the opening portion is closed with a cover, there is a possibility that an object adhered to the cover is moved over a wide range, resulting in degradation of display quality.

In the HUD described in JP2008-040091A, degradation of the quality of a displayed image caused by an object fallen on the cover closing the opening portion of the housing and moved on the front surface is not recognized, and no measures have been taken therefor.

The present invention has been made in view of the above-described circumstances, and an object of the present invention is to provide a projection display device capable of preventing significant degradation of display quality even when an object is adhered to a cover closing an opening portion of a housing, and an operation method and a non-transitory computer readable recording medium storing an operation program for the same.

A projection display device of the present invention includes: a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; a separation member that is movable and is for separating a front surface of the cover into a plurality of regions; a driving unit that drives the separation member; and an object detecting unit that detects an object approaching the front surface of the cover, wherein the driving unit moves the separation member to a position on the cover and causes the separation member to separate the cover into a plurality of regions when the object detecting unit detects an object, and the driving unit leaves the separation member retracted from the position on the cover when the object detecting unit does not detect an object.

An operation method for a projection display device of the present invention is an operation method for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a separation member that is movable and is for separating a front surface of the cover into a plurality of regions, the operation method including: an object detection step of detecting an object approaching the front surface of the cover; and a driving step of moving the separation member to a position on the cover and causing the separation member to separate the cover into a plurality of regions when the object detection step detects an object, and of leaving the separation member retracted from the position on the cover when the object detection step does not detect an object.

A non-transitory computer readable recording medium storing an operation program for a projection display device of the present invention is an operation program for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a separation member that is movable and is for separating a front surface of the cover into a plurality of regions, the operation program causing a computer to execute a driving step of moving the separation member to a position on the cover and causing the separation member to separate the cover into a plurality of regions when an object approaching the front surface of the cover is detected, and of leaving the separation member retracted from the position on the cover when the object is not detected.

According to the present invention, it is possible to provide a projection display device capable of preventing significant degradation of display quality even when an object is adhered to a cover closing an opening portion of a housing, and an operation method and a non-transitory computer readable recording medium storing an operation program for the same.

BRIEF DESCRIPTION OF THE DRAWINGS

FIG. 13 is a plan view of an external appearance configuration of an HUD 100B, which is a modification example of the HUD 100 illustrated in FIG. 1, viewed from an emission direction of image light; and FIG. 14 is a diagram illustrating a state where a separation member 11C has been moved to a position on the front surface of the cover 9, compared with the state illustrated in FIG. 13.

DESCRIPTION OF THE PREFERRED EMBODIMENTS

Hereinafter, an embodiment of the present invention will be described with reference to the drawings.

Figure 1:
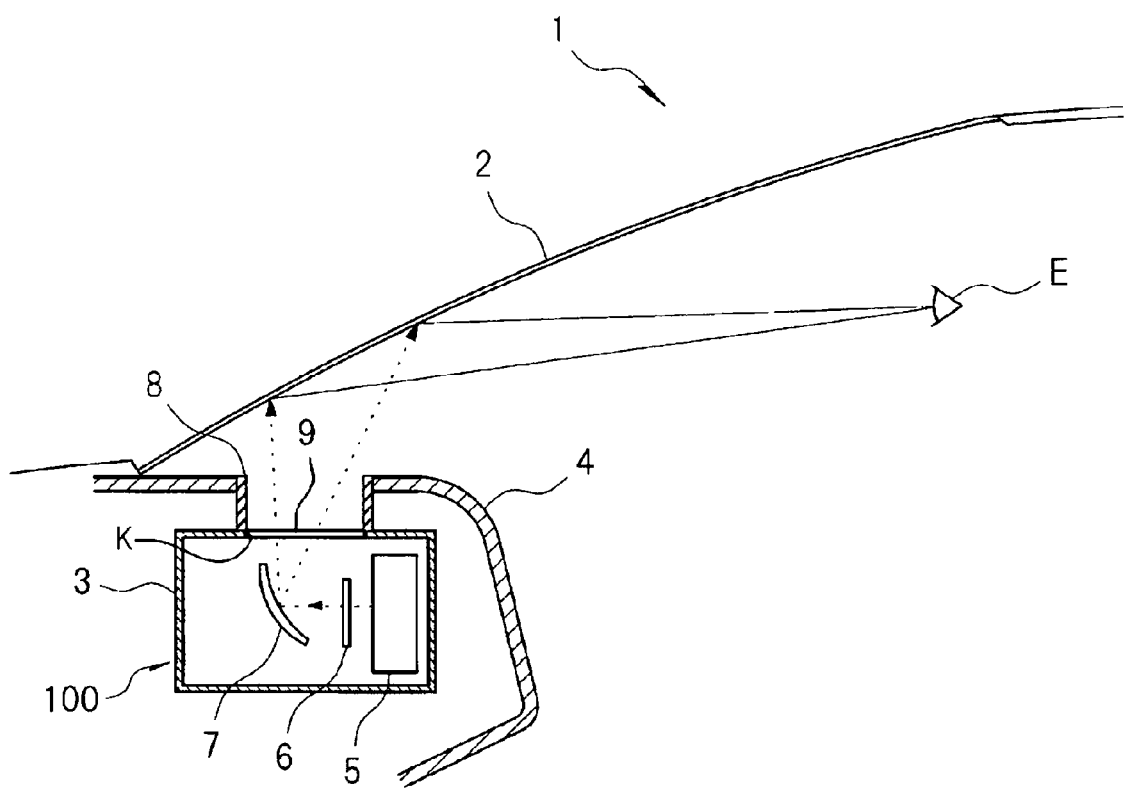
FIG. 1 is a diagram illustrating a schematic configuration of an HUD 100, which is an embodiment of a projection display device of the present invention.

FIG. 1 is a diagram illustrating a schematic configuration of a head-up display (HUD) 100, which is an embodiment of a projection display device of the present invention.

The HUD 100 is mounted in an automobile 1, uses a range of a part of a windshield 2 of the automobile 1 as a projection surface, and enables a passenger of the automobile 1 to visually recognize a virtual image or real image by using image light projected onto the projection surface.

The HUD 100 may be used by being mounted in a vehicle, such as a train, a heavy machine, a construction machine, an aircraft, a ship, or an agricultural machine, as well as an automobile.

The HUD 100 is built in a dashboard 4 of the automobile 1 such that a part of the HUD 100 is exposed. The dashboard 4 is a member that contains, in its inside, built-in components including gauges for presenting information necessary for driving, such as a speedometer, a tachometer, a fuel gauge, a water temperature gauge, an odometer, or the like of the automobile 1.

The HUD 100 includes a box-shaped housing 3 and a tubular connecting portion 8 that connects the housing 3 and an opening portion of the dashboard 4 to each other. The housing 3 accommodates a control unit 5 that includes a light source and a light modulation unit that spatially modulates, in accordance with image data, light emitted by the light source; and a diffusion member 6 and a concave mirror 7 that constitute a projection optical system that projects, onto the windshield 2, image light that has been spatially modulated by the light modulation unit. The configuration of the projection optical system is an example and is not limited to that illustrated in FIG. 1.

The housing 3 has an opening portion K. A portion around the opening portion K of the housing 3 and the opening portion of the dashboard 4 are connected to each other by the connecting portion 8.

The diffusion member 6 is a member that diffuses the image light that has been spatially modulated by the light modulation unit of the control unit 5, thereby making a plane light source. As the diffusion member 6, a micromirror array having a fine structure on its surface, a diffusion mirror, a microlens-array (MLA) diffuser, a reflection holographic diffuser, or the like is used.

The concave mirror 7 enlarges the image light diffused by the diffusion member 6 and reflects the image light toward the projection surface of the windshield 2. The image light reflected by the concave mirror 7 passes through the opening portion K of the housing 3 and a hollow portion of the connecting portion 8 and is projected toward the projection surface of the windshield 2.

The windshield 2 is designed so that the image light projected through the opening portion K and the hollow portion of the connecting portion 8 is reflected in the direction of eyes E of a driver. The image light is reflected by the windshield 2 and enter the eyes E of the driver. Accordingly, the driver is able to visually recognize an image (virtual image or real image) that is based on the image light.

The opening portion K of the housing 3 is closed with a cover 9 made of resin, glass, or the like and allowing image light to pass therethrough. The opening portion K is an emission window for allowing image light reflected by the concave mirror 7 to be emitted from the housing 3. The cover 9 is a member that prevents the entry of an object, such as dirt, dust, or liquid, into the housing 3 through the opening portion K.

The HUD 100 adopts a scheme of projecting image light onto the windshield 2. Alternatively, the HUD 100 may adopt a scheme of projecting image light onto a combiner (not illustrated) disposed before the windshield 2. In this case, the combiner constitutes a projection surface.

Figure 2:
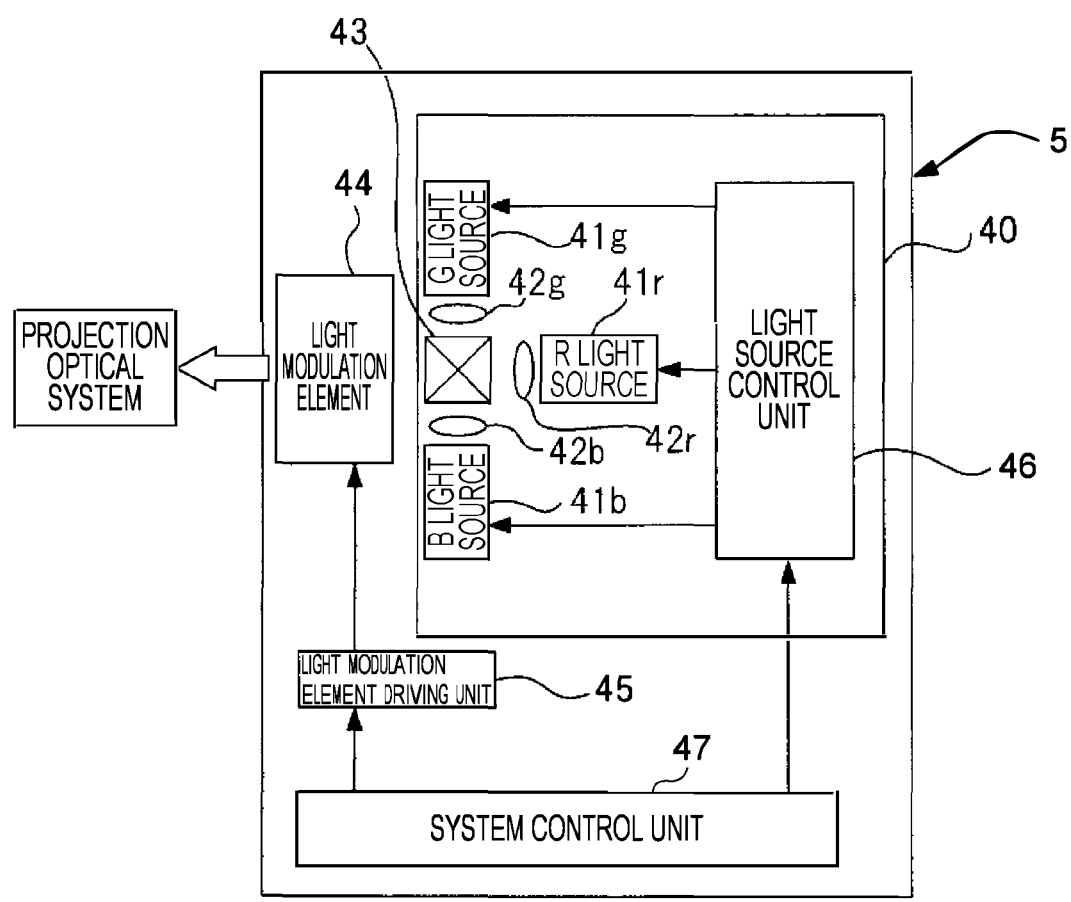
FIG. 2 is a schematic diagram illustrating an example of an internal configuration of a control unit 5 accommodated in a housing 3 of the HUD 100 illustrated in FIG. 1.

FIG. 2 is a schematic diagram illustrating an example of an internal configuration of the control unit 5 accommodated in the housing 3 of the HUD 100 illustrated in FIG. 1.

As illustrated in FIG. 2, the control unit 5 of the HUD 100 includes a light source unit 40, a light modulation element 44, a light modulation element driving unit 45 that drives the light modulation element 44, and a system control unit 47 that centrally controls the entire HUD 100.

The system control unit 47 includes a processor, a read only memory (ROM) storing a program or the like executed by the processor, and a random access memory (RAM) functioning as a work memory of the processor. The program stored in the ROM includes an operation program for the HUD 100. The processor of the system control unit 47 executes the operation program, thereby executing a driving step which will be described below.

The light source unit 40 includes a light source control unit 46, an R light source 41r serving as a red light source that emits red light, a G light source 41g serving as a green light source that emits green light, a B light source 41b serving as a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43. The R light source 41r, the G light source 41g, and the B light source 41b constitute a light source of the HUD 100.

The dichroic prism 43 is an optical member for guiding rays of light emitted by the R light source 41r, the G light source 41g, and the B light source 41b to an identical light path. The dichroic prism 43 allows red light collimated by the collimator lens 42r to pass therethrough and emits the red light to the light modulation element 44. In addition, the dichroic prism 43 allows green light collimated by the collimator lens 42g to be reflected thereby and emits the green light to the light modulation element 44. Furthermore, the dichroic prism 43 allows blue light collimated by the collimator lens 42b to be reflected thereby and emits the blue light to the light modulation element 44. The optical member having such a function is not limited to the dichroic prism. For example, a cross dichroic mirror may be used.

A light emitting element, such as a laser or a light emitting diode (LED), is used as each of the R light source 41r, the G light source 41g, and the B light source 41b. The light source of the HUD 100 is not limited to the three light sources, that is, the R light source 41r, the G light source 41g, and the B light source 41b, and may be constituted by one light source, two light sources, or four or more light sources.

The light source control unit 46 controls each of the R light source 41r, the G light source 41g, and the B light source 41b, and performs control to cause light to be emitted by each of the R light source 41r, the G light source 41g, and the B light source 41b.

The light modulation element 44 spatially modulates, in accordance with image data received from the system control unit 47, the rays of light emitted by the R light source 41r, the G light source 41g, and the B light source 41b and emitted from the dichroic prism 43.

As the light modulation element 44, for example, liquid crystal on silicon (LCOS), a digital micromirror device (DMD), a micro electro mechanical systems (MEMS) element, a liquid crystal display element, or the like may be used.

The light modulation element driving unit 45 drives the light modulation element 44 in accordance with image data received from the system control unit 47 and causes image light that has been spatially modulated in accordance with the image data (red image light, blue image light, and green image light) to be emitted from the light modulation element 44 to the diffusion member 6 of the projection optical system. The light modulation element 44 and the light modulation element driving unit 45 constitute a light modulation unit of the HUD 100.

The projection optical system constituted by the diffusion member 6 and the concave mirror 7 illustrated in FIG. 1 is optically designed so that an image that is based on image light projected onto the windshield 2 can be visually recognized by the driver as a virtual image at a position in front of the windshield 2. The projection optical system may be optically designed so that the image that is based on the image light can be visually recognized by the driver as a real image on the windshield 2.

The system control unit 47 controls the light source control unit 46 and the light modulation element driving unit 45 and causes image light that has been spatially modulated in accordance with image data to be emitted to the diffusion member 6.

Figure 3:
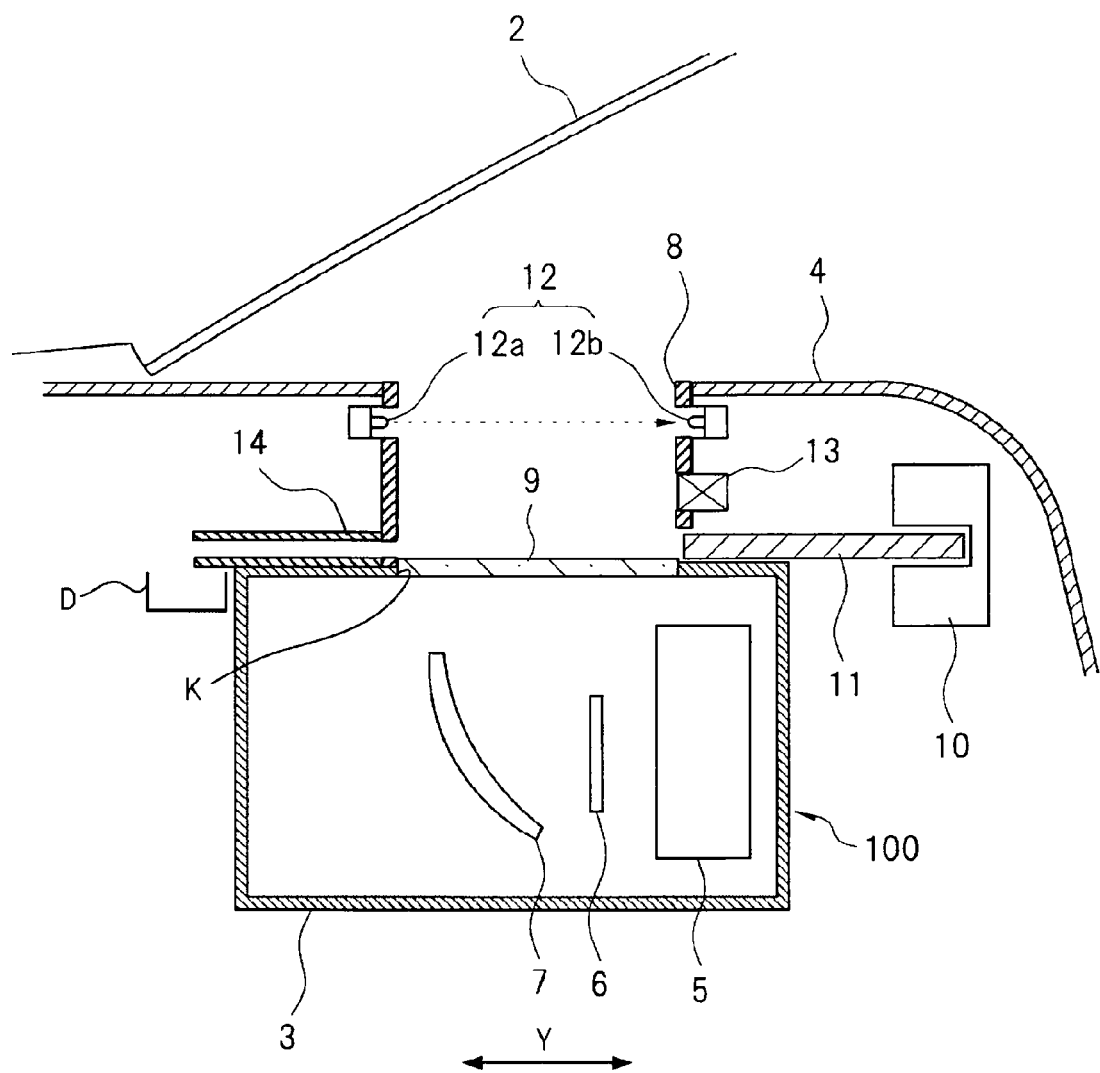
FIG. 3 is an enlarged view illustrating a more detailed configuration of the HUD 100 illustrated in FIG. 1.
Figure 4:
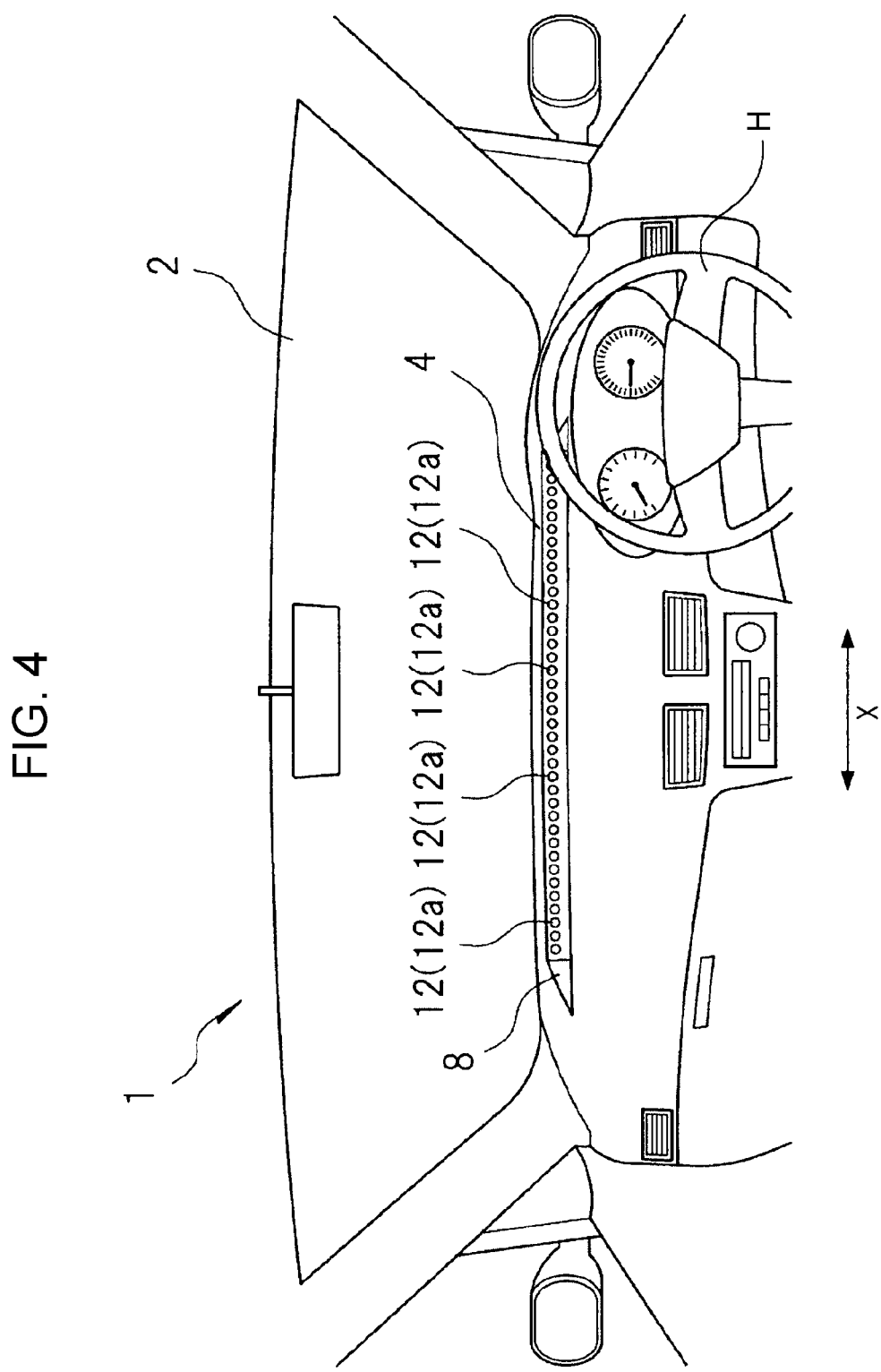
FIG. 4 is a diagram illustrating an external appearance of a connecting portion 8 of the HUD 100 illustrated in FIG. 1.
Figure 5:
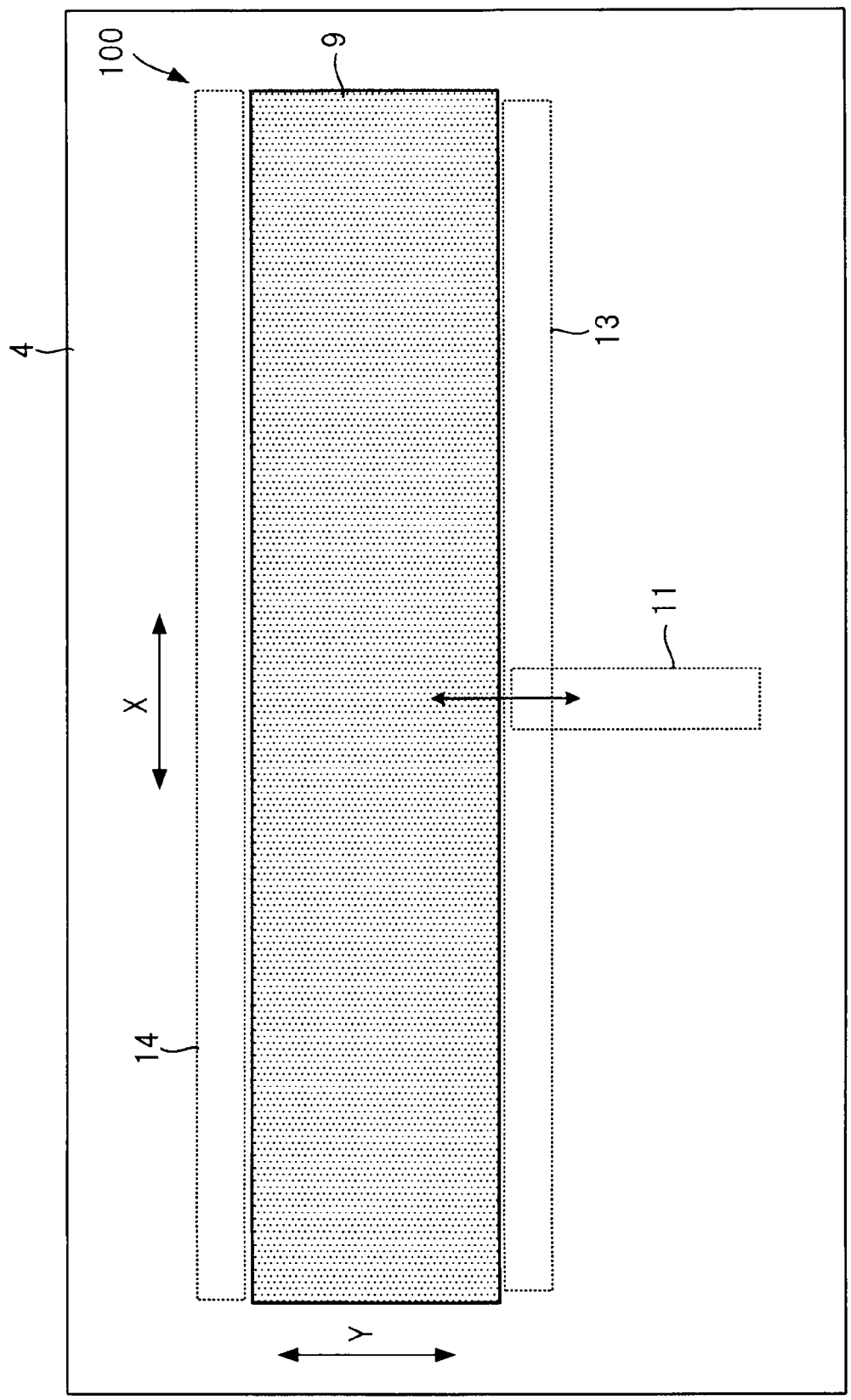
FIG. 5 is a schematic plan view of the HUD 100 illustrated in FIG. 1 viewed from an emission direction of image light emitted from a cover 9.

FIG. 3 is an enlarged view illustrating a more detailed configuration of the HUD 100 illustrated in FIG. 1. FIG. 4 is a diagram illustrating an external appearance of the connecting portion 8 of the HUD 100 illustrated in FIG. 1. FIG. 5 is a schematic plan view of the HUD 100 illustrated in FIG. 1 viewed from an emission direction of image light emitted from the cover 9.

As illustrated in FIG. 3, the HUD 100 includes the housing 3, the connecting portion 8, a movable separation member 11, a driving unit 10 that drives the separation member 11, an object detecting unit 12, an object removing unit 13, a discharge unit 14, and a dust box D.

As illustrated in FIG. 4, the connecting portion 8 of the HUD 100 has a hollow portion that is substantially a rectangular parallelepiped, and the planar shape of the cover 9 viewed from a direction in which image light is emitted is a rectangle whose longitudinal direction is a direction X in which a driver's seat and a passenger seat of the automobile 1 are arranged. The automobile 1 has a configuration in which the driver's seat is disposed at a position facing a steering wheel H illustrated in FIG. 4 and the passenger seat is disposed to the left of the driver's seat.

The direction X in which the driver's seat and the passenger seat of the automobile 1 are arranged is the same as a direction substantially orthogonal to the driving direction of the automobile 1 when the automobile 1 drives straight. A state where two directions are substantially orthogonal to each other means that the angle between the two directions is in the range from 70 degrees to 110 degrees.

As illustrated in FIG. 5, the planar shape of the cover 9 viewed from the emission direction of image light is a rectangle whose longitudinal direction is the direction X. With this shape of the cover 9 that is long in the direction X, an image can be displayed in a wide range of the windshield 2.

The separation member 11 is a member for separating a front surface (the surface facing the windshield 2) of the cover 9 into two regions arranged in the direction X. The separation member 11 is supported by the driving unit 10 so as to be insertable to and retractable from a position on the front surface of the cover 9.

In the plan view illustrated in FIG. 5, the separation member 11 is a rectangular-pillar member whose length in a direction Y orthogonal to the direction X is equal to or greater than the length of the cover 9 in the direction Y and whose length in the direction X is sufficiently smaller than the length of the cover 9 in the direction X. The direction Y is the same as the driving direction of the automobile 1 when the automobile 1 drives straight.

Preferably, the separation member 11 is made of a material with high stiffness for the purpose of being moved stably, and resin, glass, or the like is used.

The driving unit 10 illustrated in FIG. 3 is connected to the system control unit 47 of the control unit 5 illustrated in FIG. 2, drives the separation member 11 in accordance with an instruction from the system control unit 47, and moves the separation member 11 in the direction Y.

Figure 6:
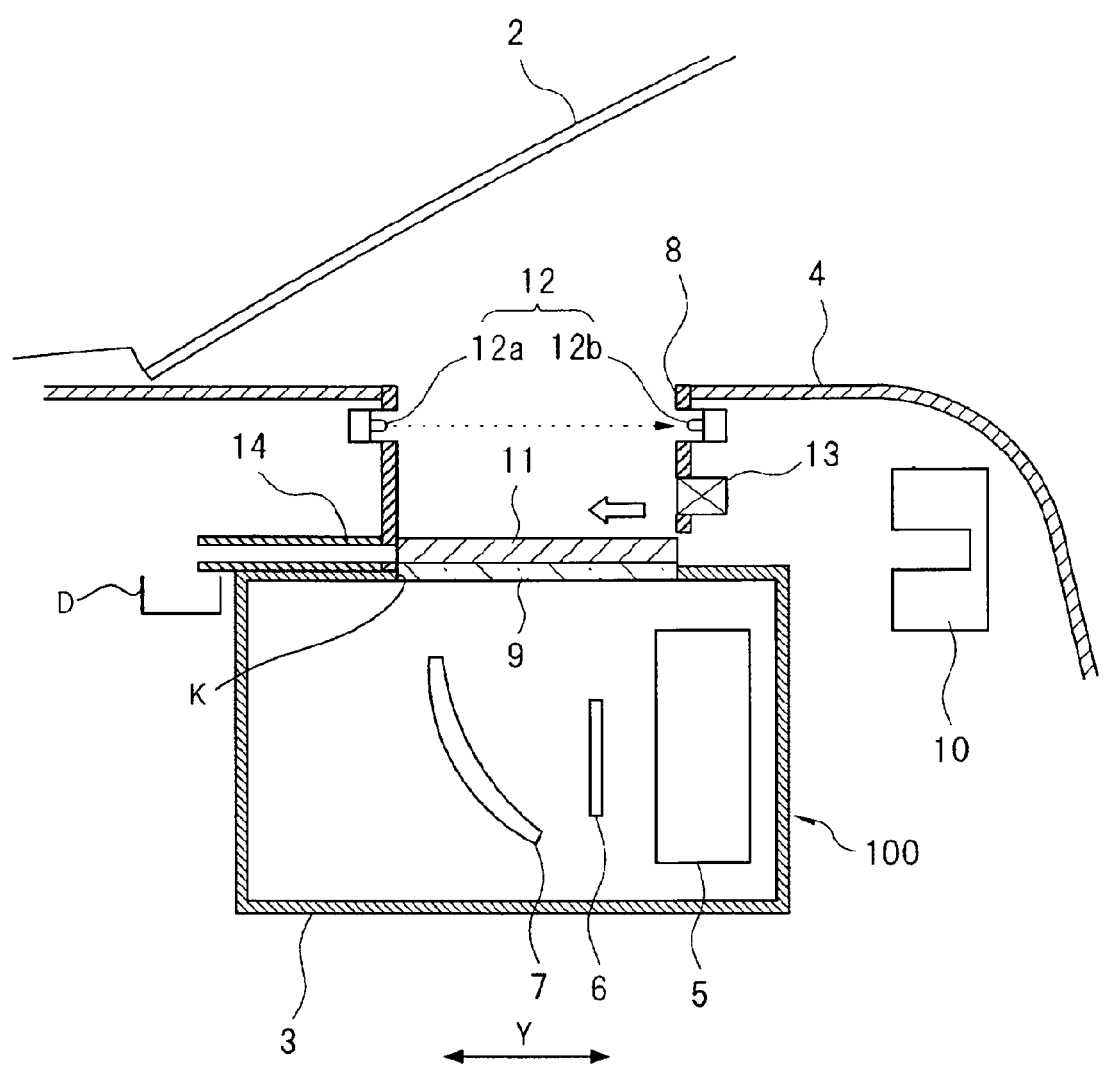
FIG. 6 is a diagram illustrating a state where a separation member 11 has been moved to a position on a front surface of the cover 9, compared with the state illustrated in FIG. 3.
Figure 7:
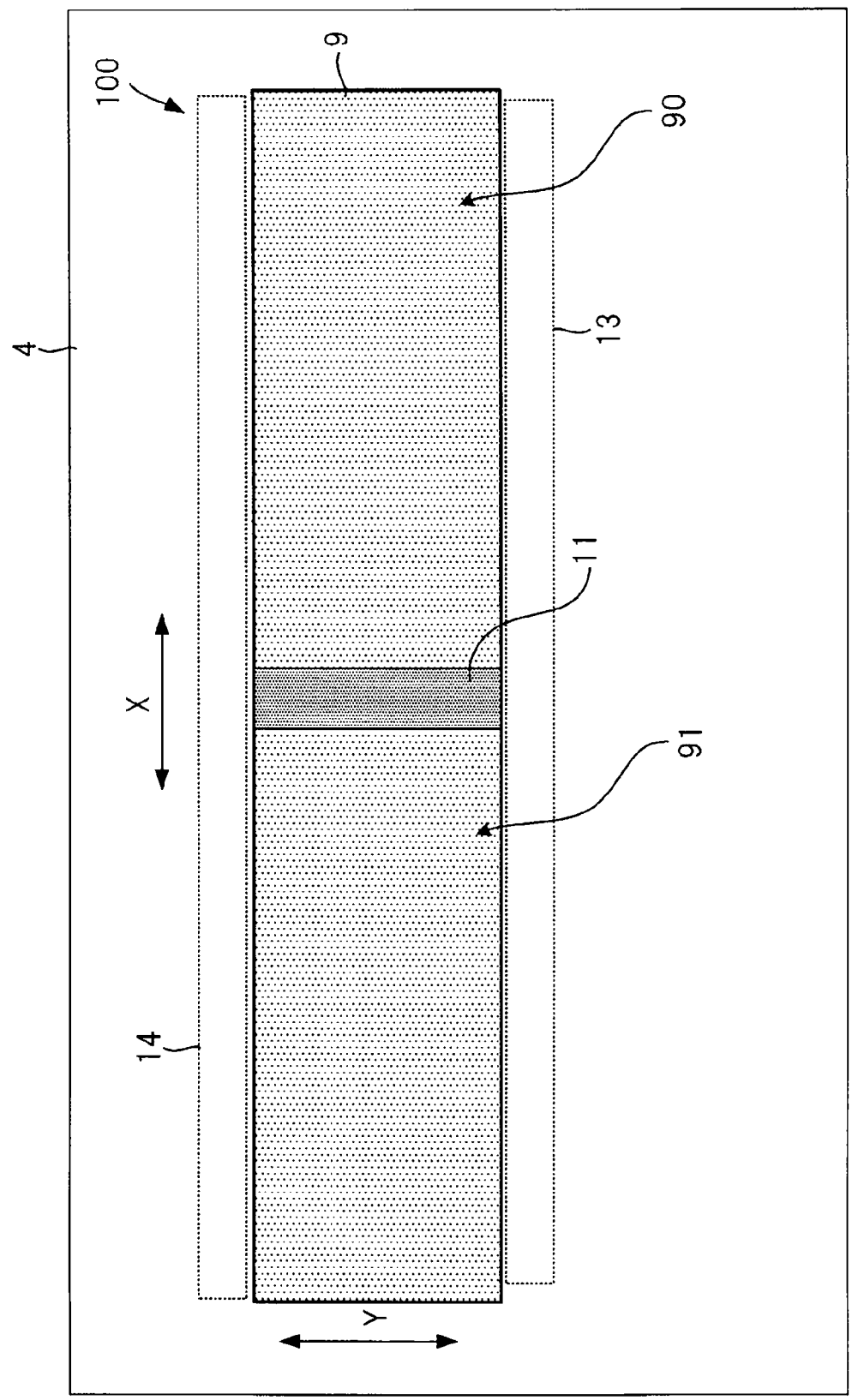
FIG. 7 is a diagram illustrating a state where the separation member 11 has been moved to a position on the front surface of the cover 9, compared with the state illustrated in FIG. 5.

FIG. 6 is a diagram illustrating a state where the separation member 11 has been moved to a position on the front surface of the cover 9, compared with the state illustrated in FIG. 3. FIG. 7 is a diagram illustrating a state where the separation member 11 has been moved to a position on the front surface of the cover 9, compared with the state illustrated in FIG. 5.

The driving unit 10 drives the separation member 11 to switch between a state where the separation member 11 has been moved to a position on the front surface of the cover 9 and the front surface of the cover 9 is separated into two regions, a driver-side region 90 and a passenger-side region 91 arranged in the direction X, as illustrated in FIGS. 6 and 7; and a state where the separation member 11 has been retracted from the position on the front surface of the cover 9 and the front surface of the cover 9 is not separated, as illustrated in FIGS. 3 and 5.

As illustrated in FIG. 6, in the state where the separation member 11 has been moved to the position on the front surface of the cover 9, a lower surface of the separation member 11 and the front surface of the cover 9 are in contact with each other and there is no gap therebetween. Thus, in this state, a movement of an object from one of the driver-side region 90 and the passenger-side region 91 to the other is blocked by the separation member 11.

The object detecting unit 12 illustrated in FIG. 3 detects the presence/absence of an object that falls from the inside of the automobile 1 into the hollow portion of the connecting portion 8 and approaches the front surface of the cover 9. The object detecting unit 12 is built in an inner wall of the connecting portion 8 at an upper position relative to the separation member 11 in a state where the separation member 11 is on the front surface of the cover 9 (the state in FIG. 6).

The object detecting unit 12 is constituted by a transmissive sensor having a light transmitting unit formed of a light emitting element 12a and a light receiving unit formed of a light receiving element 12b disposed at a position facing the light emitting element 12a.

As illustrated in FIG. 4, many pairs of the light emitting element 12a and the light receiving element 12b constituting the object detecting unit 12 are arranged at small intervals along long sides facing each other of the connecting portion 8. Thus, no matter where an object falls in the hollow portion of the connecting portion 8, the presence/absence thereof can be detected.

The many pairs of the light emitting element 12a and the light receiving element 12b constituting the object detecting unit 12 may be arranged at small intervals along short sides facing each other of the connecting portion 8. In the case of this configuration, the number of pairs of the light emitting element 12a and the light receiving element 12b can be reduced, and the cost can be reduced.

The pairs of the light emitting element 12a and the light receiving element 12b may be arranged along the entire circumference of the inner wall of the connecting portion 8. In the case of this configuration, the accuracy of object detection can be increased.

The light emission state of the light emitting element 12a of the object detecting unit 12 is controlled by the system control unit 47 of the control unit 5 illustrated in FIG. 2.

The light receiving element 12b of the object detecting unit 12 is connected to the system control unit 47 of the control unit 5 illustrated in FIG. 2. When light emitted by the light emitting element 12a reaches the light receiving element 12b, an electric signal indicating that no object has been detected is input from the light receiving element 12b to the system control unit 47.

The object detecting unit 12 may be constituted by, instead of the above-described transmissive sensor, a retro-reflective sensor that detects an object in accordance with the presence/absence of reflected light of light emitted by a light transmitting unit toward a reflection plate, a diffuse-reflective sensor that detects an object in accordance with the presence/absence of reflected light of light emitted by a light transmitting unit toward the object, or the like, for example.

The system control unit 47 of the HUD 100 performs a driving step in which, in a state where the light emitting element 12a of the object detecting unit 12 is controlled to be in a light emission state, when the light travelling from the light emitting element 12a toward the light receiving element 12b is blocked and the supply of an electric signal from the light receiving element 12b is shut off, the system control unit 47 determines that an object approaching the cover 9 has been detected and controls the driving unit 10 to move the separation member 11 to a position on the front surface of the cover 9, and, in a state where the light emitting element 12a of the object detecting unit 12 is controlled to be in a light emission state, when the supply of an electric signal from the light receiving element 12b is not shut off, the system control unit 47 determines that an object approaching the cover 9 has not been detected and controls the driving unit 10 to leave the separation member 11 retracted from the position on the front surface of the cover 9.

The object removing unit 13 illustrated in FIG. 3 is built in the inner wall of the connecting portion 8 at an upper position relative to the separation member 11 in a state where the separation member 11 is on the front surface of the cover 9 (the state in FIG. 6).

The object removing unit 13 is equipped with a blower function of blowing wind onto the front surface of the cover 9 and forcibly moves an object adhered to the front surface of the cover 9 toward the discharge unit 14.

When the object adhered to the front surface of the cover 9 is liquid, the object removing unit 13 is able to forcibly move the liquid toward the discharge unit 14 and to evaporate the liquid remaining on the front surface of the cover 9 by using wind.

The object removing unit 13 may be constituted by, instead of a unit equipped with the above-described blower function, an electric brush or an air suction mechanism or the like attached to the discharge unit 14 side, for example.

The discharge unit 14 discharges an object adhered to the front surface of the cover 9 to the outside of the hollow portion of the connecting portion 8.

The discharge unit 14 is constituted by a hole portion in the inner wall of the connecting portion 8 and a tubular member connected to the hole portion, the hole portion being provided near an end portion of the cover 9 in the direction Y.

An object that has been moved to the hole portion of the discharge unit 14 from the front surface of the cover 9 passes through the hollow portion of the tubular member of the discharge unit 14 and is discharged into the dust box D. Preferably, the dust box D is detachable.

Next, an operation of the HUD 100 will be described.

Upon the power of the HUD 100 being turned on, the system control unit 47 starts inputting image data to the light modulation element driving unit 45 and controls the light emitting element 12a of each object detecting unit 12 to be in a light emission state.

When an object falls into the hollow portion of the connecting portion 8 from above the connecting portion 8 of the housing 3, light traveling from the light emitting element 12a of the object detecting unit 12 toward the light receiving element 12b is blocked and thus the object is detected, so that the supply of an electric signal from the light receiving element 12b to the system control unit 47 is shut off.

When the supply of an electric signal from the object detecting unit 12 is shut off, the system control unit 47 controls the driving unit 10 to move the separation member 11 to a position on the front surface of the cover 9, as illustrated in FIGS. 6 and 7.

Accordingly, when the detected object is adhered to the driver-side region 90, for example, a movement of the object to the passenger-side region 91 is prevented. On the other hand, when the detected object is adhered to the passenger-side region 91, a movement of the object to the driver-side region 90 is prevented.

In the state illustrated in FIGS. 6 and 7 where the separation member 11 has been moved to the position on the front surface of the cover 9, the system control unit 47 controls the object removing unit 13 to blow wind onto the front surface of the cover 9. Accordingly, the object adhered to the front surface of the cover 9 is moved to the discharge unit 14 and is removed from the front surface of the cover 9.

When a sufficient period of time for discharging the object to the discharge unit 14 by an operation of the object removing unit 13 elapses from when the separation member 11 is moved to the position on the front surface of the cover 9, the system control unit 47 determines that the object has been removed, controls the driving unit 10 to retract the separation member 11 from the position on the front surface of the cover 9, and stops the object removing unit 13.

As described above, according to the HUD 100, when an object falls into the hollow portion of the connecting portion 8 of the housing 3, the separation member 11 separates the front surface of the cover 9 into two regions. Accordingly, even when the object is adhered to the front surface of the cover 9, diffusion of the object over a wide region of the front surface of the cover 9 can be prevented.

For example, when an object is adhered to one region out of the two regions separated from each other of the front surface of the cover 9, degradation of the display quality of an image that is based on image light projected from the other region out of the two regions can be prevented. Thus, even when the object is adhered to the cover 9, significant degradation of display quality can be prevented.

With the configuration having the object removing unit 13 and the discharge unit 14, the HUD 100 is able to quickly restore a region of the front surface of the cover 9 to which an object is adhered to a clean state. Thus, a period over which a part of image light projected from the region to which the object is adhered is blocked by the object can be minimized, and display quality can be enhanced.

The object detecting unit 12 of the HUD 100 may be configured to detect only an object approaching the passenger-side region 91 illustrated in FIG. 7. With this configuration, when an object falls on the passenger-side region 91, a movement of the object to the driver-side region 90 can be prevented. In addition, with this configuration, the manufacturing cost of the HUD 100 can be reduced.

In a configuration in which the cover 9 extends over a wide range of the dashboard 4, as in the HUD 100, a person seated on the passenger seat is more likely to cause an object, such as food or drink, to adhere to the cover 9 than a person seated on the driver's seat. This is because a driver seated on the driver's seat concentrates on driving and the motions thereof are limited, whereas a fellow passenger seated on the passenger seat is in a free state with the motion thereof not being limited. Thus, even a configuration in which the object detecting unit 12 detects only an object approaching the passenger-side region 91 and the system control unit 47 drives the separation member 11 is able to sufficiently obtain an effect of preventing degradation of display quality.

When the size of the display screen of the HUD 100 is increased, it is assumed that important information, such as a warning, is displayed in front of the driver's seat. Thus, it is important to prevent degradation of the display quality of an image that is based on image light projected from the driver-side region 90 as described above.

Figure 8:
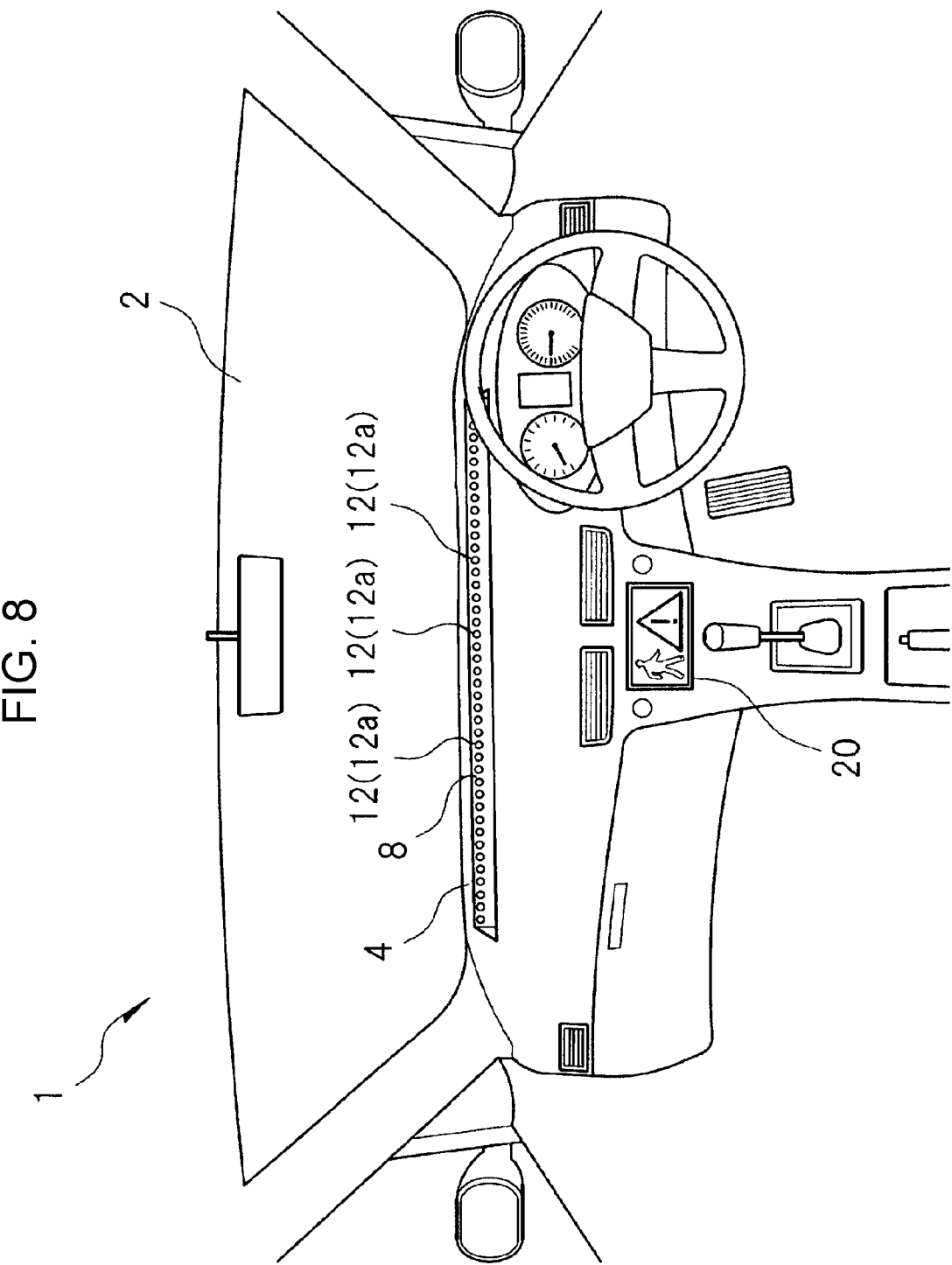
FIG. 8 is a schematic diagram for describing a modification example of an operation of the HUD 100 illustrated in FIG. 1.

When moving the separation member 11 to a position on the front surface of the cover 9, the system control unit 47 of the HUD 100 may display, on a display device 20 different from the HUD 100 mounted in the automobile 1 as illustrated in FIG. 8, an image that is based on image light projected onto the windshield 2 through a region to which an object is adhered out of the two regions separated by the separation member 11. In this case, the system control unit 47 functions as a display control unit.

Specifically, when the object detecting unit 12 detects an object, the system control unit 47 determines, in accordance with position information of the pair of the light emitting element 12a and the light receiving element 12b that has detected the object, which of the driver-side region 90 and the passenger-side region 91 is a region where the object falls. Subsequently, the system control unit 47 outputs, to the display device 20, data corresponding to image light projected through the region where it has been determined that the object falls, the data being included in image data that has been input to the light modulation element driving unit 45.

For example, when it is determined that the object falls on the passenger-side region 91, data corresponding to image light projected from the passenger-side region 91 is output to the display device 20, and an image based on the data is displayed on the display device 20.

Accordingly, even if a part of the image light projected from the passenger-side region 91 is blocked by the object, the same image as the image based on the image light can be viewed on the display device 20. Thus, missing of information to be presented to the driver can be prevented.

The object removing unit 13 of the HUD 100 may be configured to be able to separately send wind to each of the passenger-side region 91 and the driver-side region 90 illustrated in FIG. 7. In the case of this configuration, the system control unit 47 causes the object removing unit 13 to send wind to only a region where it has been determined that an object is adhered. With this configuration, the power consumption of the HUD 100 can be reduced.

The separation member 11 of the HUD 100 may be made of a material that allows image light to pass therethrough, like the cover 9. With this configuration, image light is able to pass through the separation member 11 even in a state where an object has been detected by the object detecting unit 12 and the separation member 11 has been moved to a position on the front surface of the cover 9. As a result, a decrease in the amount of information that can be displayed can be prevented.

According to the description given above, the system control unit 47 causes the separation member 11 to be retracted from the position on the front surface of the cover 9 after the object removing unit 13 has removed an object. Alternatively, the retraction of the separation member 11 may be performed in response to an instruction from a user.

According to the description given above, the completion of removal of an object by the object removing unit 13 is determined by the system control unit 47 in accordance with the period of time elapsed from when the separation member 11 is moved to a position on the cover 9, but the present invention is not limited thereto.

For example, an imaging unit that captures an image of the front surface of the cover 9 may be added to the HUD 100. The system control unit 47 may analyze a captured image signal output from the imaging unit to determine whether or not an object has been removed, and may start retracting the separation member 11 upon determining that the object has been removed.

In a state where the image data that has been input to the light modulation element driving unit 45 includes data for displaying predetermined information and the object detecting unit 12 has detected an object, the system control unit 47 of the HUD 100 may control the driving unit 10 not to move the separation member 11 to a position on the cover 9.

The predetermined information is, for example, warning information or the like for notifying the driver that danger is approaching, for example, an obstacle is approaching.

For example, assume a case where the object adhered to the front surface of the cover 9 is liquid and the liquid is at a position of blocking image light corresponding to warning information. In this case, the liquid will diffuse over the front surface of the cover 9 if the separation member 11 is not moved to a position on the cover 9, as described above. However, when the liquid diffuses over a wide range of the front surface of the cover 9 and a film thickness per unit area decreases, a part of image light corresponding to the warning information is projected onto the windshield 2. In this way, with a slight amount of image light corresponding to the warning information being projected onto the windshield 2, display based on the image light enables the driver to recognize the existence of the warning. As a result, an action can be taken in preparation for danger, and safe driving can be assisted.

The HUD 100 has a single separation member 11 and is configured to be able to separate the front surface of the cover 9 into two regions by the separation member 11, but may be configured to separate the front surface of the cover 9 into three or more regions in the direction X.

Figure 9:
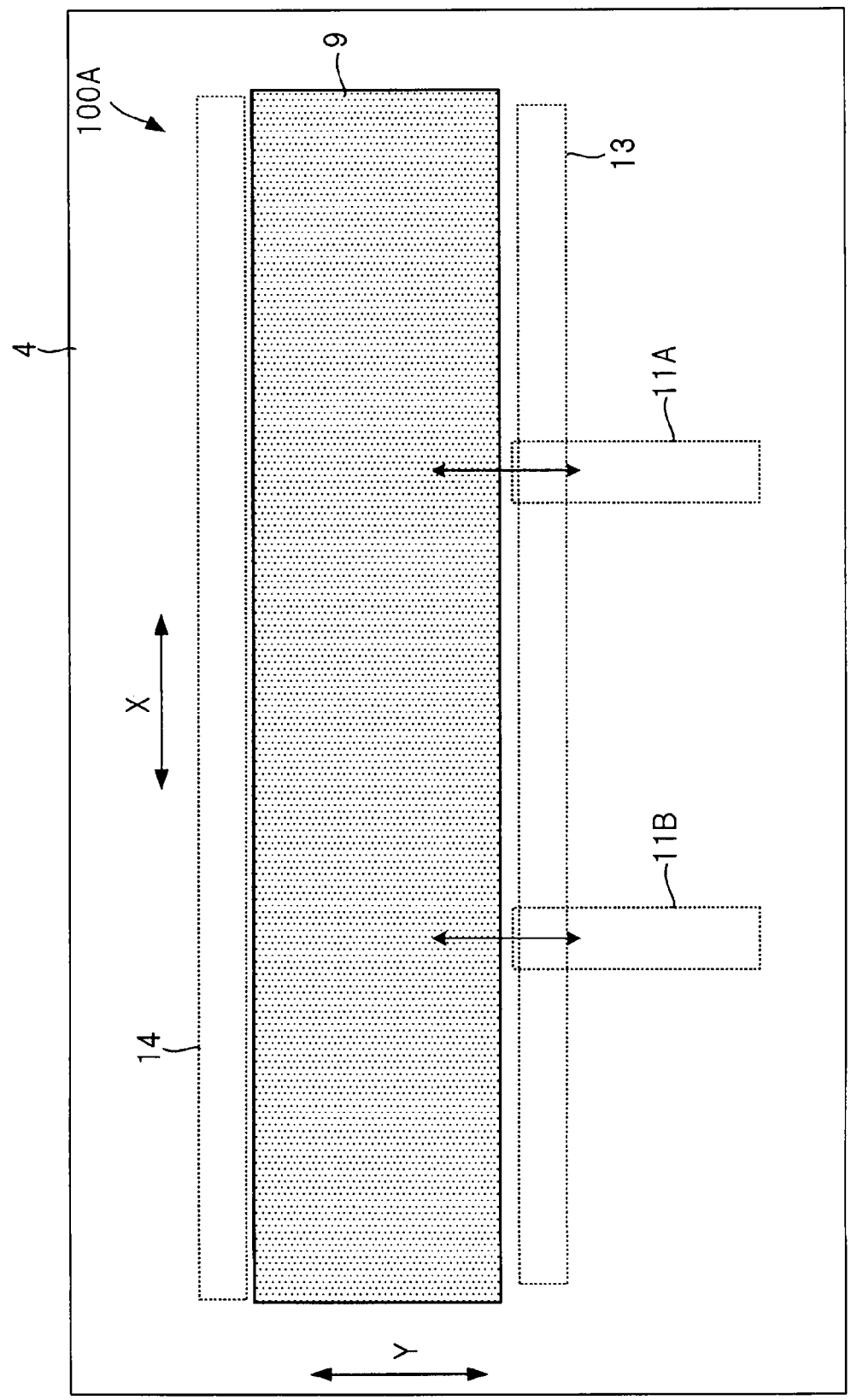
FIG. 9 is a plan view of an external appearance configuration of an HUD 100A, which is a modification example of the HUD 100 illustrated in FIG. 1, viewed from an emission direction of image light.

FIG. 9 is a plan view of an external appearance configuration of an HUD 100A, which is a modification example of the HUD 100 illustrated in FIG. 1, viewed from an emission direction of image light.

The HUD 100A has the same configuration as that of the HUD 100 except that two separation members, a separation member 11A and a separation member 11B, are used instead of the separation member 11.

The separation member 11A and the separation member 11B are away from each other in the direction X, and are members for separating the front surface of the cover 9 into up to three regions arranged in the direction X. The separation member 11A and the separation member 11B are supported by the driving unit 10 so as to be insertable to and retractable from a position on the front surface of the cover 9.

In the plan view illustrated in FIG. 9, each of the separation member 11A and the separation member 11B is a rectangular-pillar member whose length in the direction Y is equal to or greater than the length of the cover 9 in the direction Y and whose length in the direction X is sufficiently smaller than the length of the cover 9 in the direction X.

Preferably, each of the separation member 11A and the separation member 11B is made of a material with high stiffness for the purpose of being moved stably, and resin, glass, or the like is used.

The driving unit 10 of the HUD 100A independently drives each of the separation member 11A and the separation member 11B in accordance with an instruction from the system control unit 47, and moves each of the separation member 11A and the separation member 11B in the direction Y.

Figure 10:
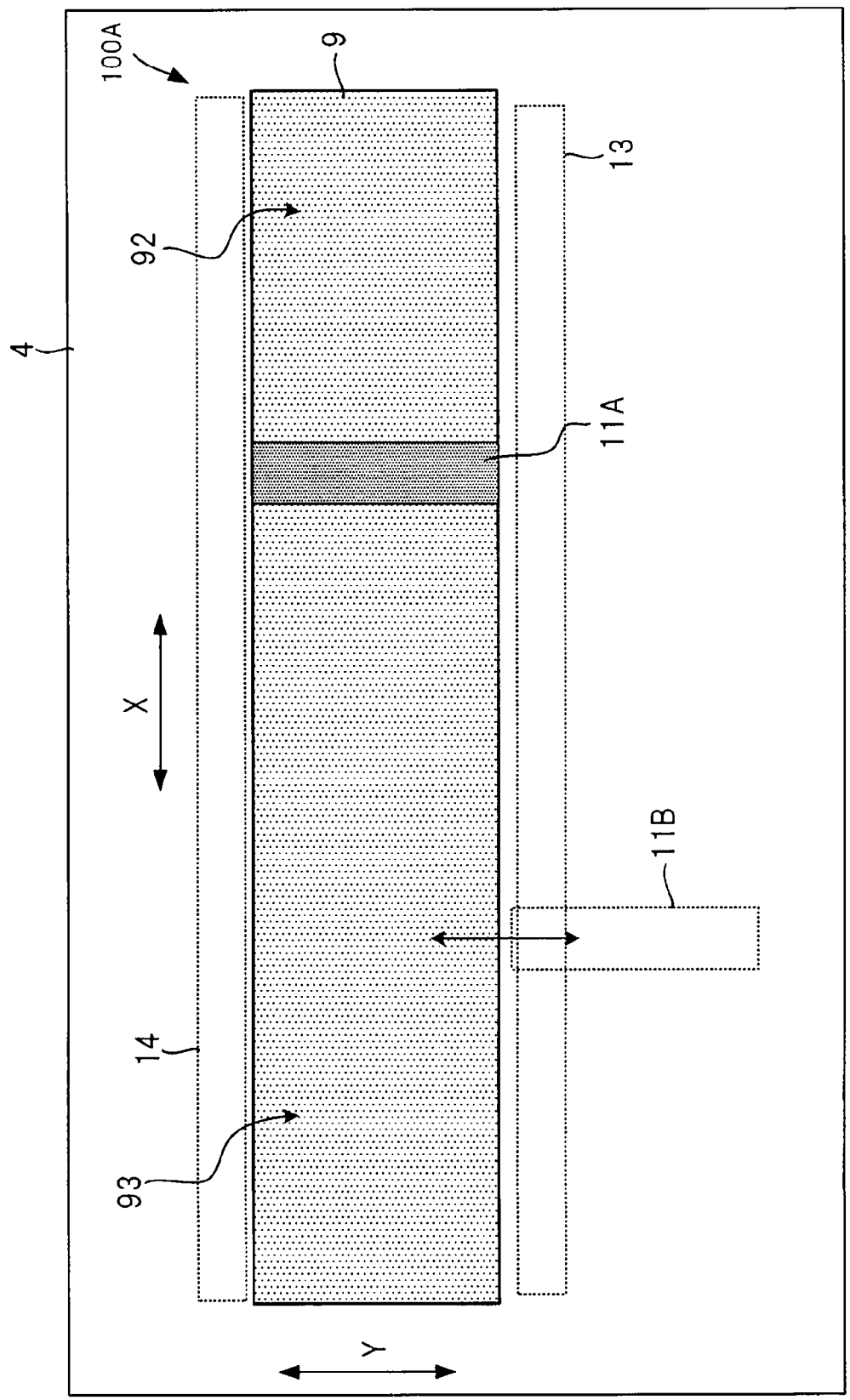
FIG. 10 is a diagram illustrating a state where a separation member 11A has been moved to a position on the front surface of the cover 9, compared with the state illustrated in FIG. 9.
Figure 11:
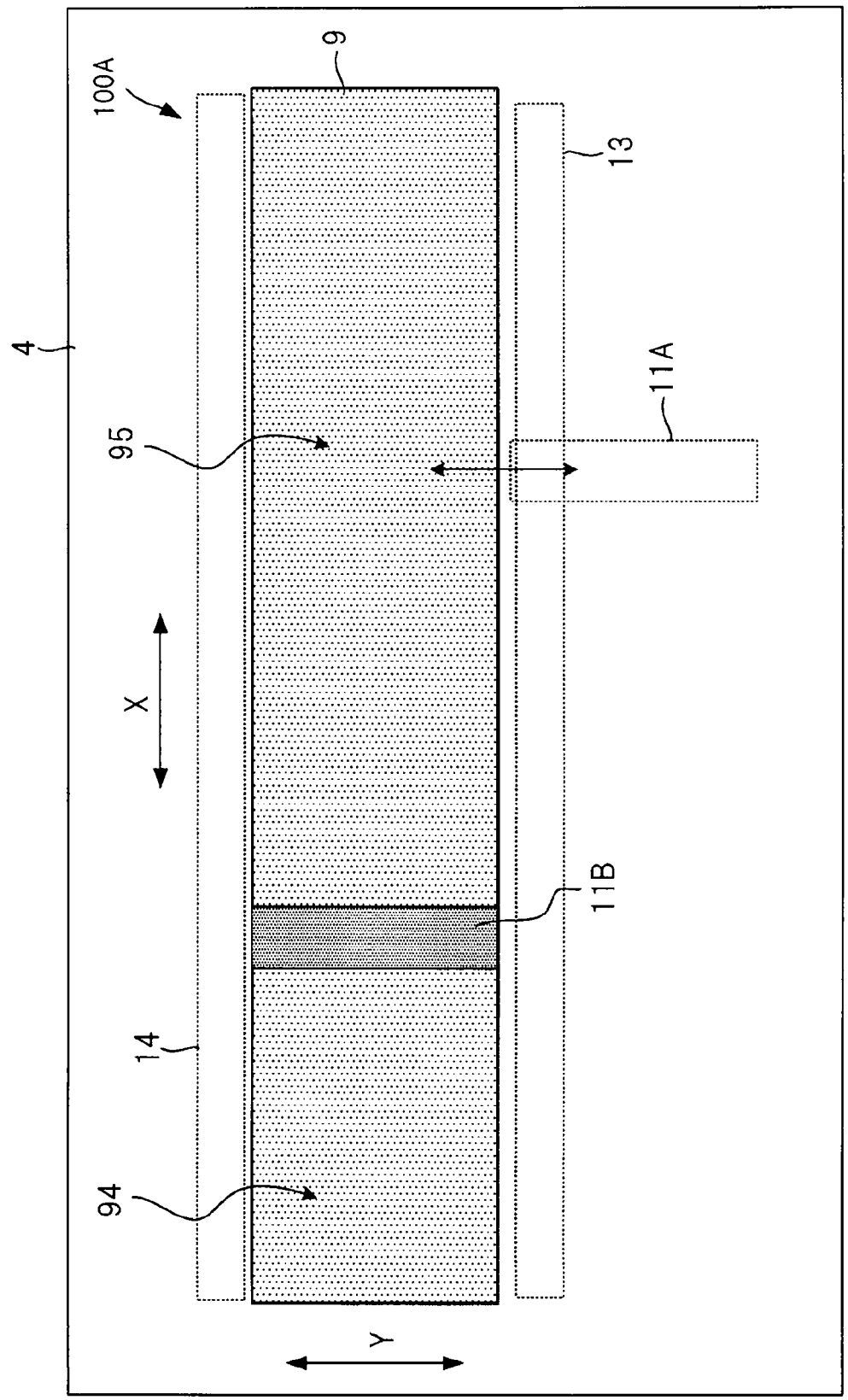
FIG. 11 is a diagram illustrating a state where a separation member 11B has been moved to a position on the front surface of the cover 9, compared with the state illustrated in FIG. 9.
Figure 12:
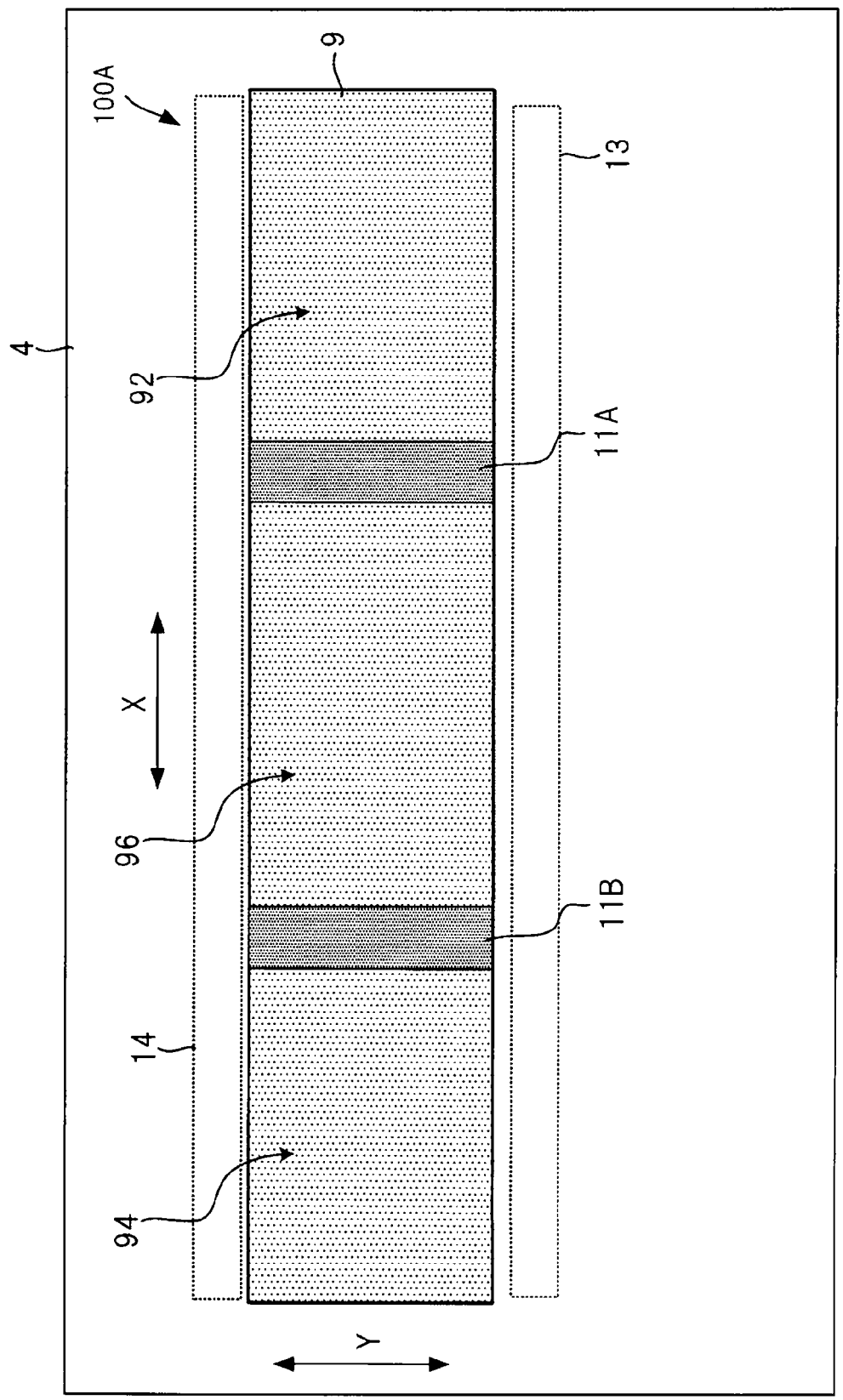
FIG. 12 is a diagram illustrating a state where the separation member 11A and the separation member 11B have been moved to positions on the front surface of the cover 9, compared with the state illustrated in FIG. 9.

FIG. 10 is a diagram illustrating a state where the separation member 11A has been moved to a position on the front surface of the cover 9, compared with the state illustrated in FIG. 9. FIG. 11 is a diagram illustrating a state where the separation member 11B has been moved to a position on the front surface of the cover 9, compared with the state illustrated in FIG. 9. FIG. 12 is a diagram illustrating a state where the separation member 11A and the separation member 11B have been moved to positions on the front surface of the cover 9, compared with the state illustrated in FIG. 9.

The driving unit 10 drives the separation member 11A to move the separation member 11A to a position on the front surface of the cover 9 and to obtain a state where the front surface of the cover 9 is separated into two regions, a region 92 and a region 93 arranged in the direction X, as illustrated in FIG. 10.

The driving unit 10 drives the separation member 11B to move the separation member 11B to a position on the front surface of the cover 9 and to obtain a state where the front surface of the cover 9 is separated into two regions, a region 94 and a region 95 arranged in the direction X, as illustrated in FIG. 11.

The driving unit 10 drives both the separation member 11A and the separation member 11B to obtain a state where the front surface of the cover 9 is separated into three regions, the region 92, a region 96, and the region 94 arranged in the direction X, as illustrated in FIG. 12.

When the object detecting unit 12 detects an object, the system control unit 47 of the HUD 100A determines, in accordance with position information of the pair of the light emitting element 12*a* and the light receiving element 12*b* that has detected the object, which of the region 92, the region 94, and the region 96 is a region where the object falls.

When the region 92 is the region where the object falls, the system control unit 47 moves only the separation member 11A to the position on the front surface of the cover 9 and performs control to cause the state illustrated in FIG. 10.

When the region 94 is the region where the object falls, the system control unit 47 moves only the separation member 11B to the position on the front surface of the cover 9 and performs control to cause the state illustrated in FIG. 11.

When the region 96 is the region where the object falls, the system control unit 47 moves the separation member 11A and the separation member 11B to the positions on the front surface of the cover 9 and performs control to cause the state illustrated in FIG. 12.

In any case, when the separation member 11A or the separation member 11B is moved to a position on the front surface of the cover 9, the object removing unit 13 is operated and an object adhered to the front surface of the cover 9 is sent to the discharge unit 14.

As described above, according to the HUD 100A, the front surface of the cover 9 can be separated into up to three regions, and thus a range where an object adhered to the front surface of the cover 9 diffuses can be narrowed. In any case where the system control unit 47 performs control to cause the state illustrated in FIG. 10, 11, or 12, the region where display quality does not degrade is larger than the passenger-side region 91 or the driver-side region 90 illustrated in FIG. 7. Thus, degradation of display quality can be further reduced.

Each of the HUD 100 and the HUD 100A is configured to separate the front surface of the cover 9 into a plurality of regions in the direction X by using a separation member, but may be configured to separate the front surface of the cover 9 into a plurality of regions in the direction Y.

FIG. 13 is a plan view of an external appearance configuration of an HUD 100B, which is a modification example of the HUD 100 illustrated in FIG. 1, viewed from an emission direction of image light.

The HUD 100B has the same configuration as that of the HUD 100 except that a separation member 11C is used instead of the separation member 11 and that the positions of the object removing unit 13 and the discharge unit 14 are different.

The separation member 11C is a member for separating the front surface of the cover 9 into two regions arranged in the direction Y. The separation member 11C is supported by the driving unit 10 so as to be insertable to and retractable from a position on the front surface of the cover 9.

In the plan view illustrated in FIG. 13, the separation member 11C is a rectangular-pillar member whose length in the direction X is equal to or greater than the length of the cover 9 in the direction X and whose length in the direction Y is sufficiently smaller than the length of the cover 9 in the direction Y.

Preferably, the separation member 11C is made of a material with high stiffness for the purpose of being moved stably, and resin, glass, or the like is used.

The driving unit 10 of the HUD 100B drives the separation member 11C in accordance with an instruction from the system control unit 47, and moves the separation member 11C in the direction X.

FIG. 14 is a diagram illustrating a state where the separation member 11C has been moved to a position on the front surface of the cover 9, compared with the state illustrated in FIG. 13.

The driving unit 10 drives the separation member 11C to move the separation member 11C to a position on the front surface of the cover 9 and to obtain a state where the front surface of the cover 9 is separated into two regions, a region 98 and a region 99 arranged in the direction Y, as illustrated in FIG. 14.

When the object detecting unit 12 detects an object, the system control unit 47 of the HUD 100B controls the driving unit 10 to cause the state illustrated in FIG. 14. Accordingly, when an object is adhered to one of the region 98 and the region 99, a movement of the object to the other of the region 98 and the region 99 can be prevented, and degradation of display quality can be prevented.

According to the HUD 100B, the separation member 11C separates the front surface of the cover 9 in the direction Y. Thus, a projection range of image light projected from a region where an object is not adhered can be kept wide, and an area with no degradation of display quality can be widened.

In the description given above, the cover 9 is fitted to the opening portion K, but it is sufficient that the cover 9 be able to close the opening portion K. For example, the cover 9 may be fixed to an outer peripheral surface of the housing 3 and the entire opening portion K may be covered with a rear surface of the cover 9, so as to close the opening portion K.

As described above, this specification discloses the followings.

(1) A projection display device including: a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; a separation member that is movable and is for separating a front surface of the cover into a plurality of regions; a driving unit that drives the separation member; and an object detecting unit that detects an object approaching the front surface of the cover, wherein the driving unit moves the separation member to a position on the cover and causes the separation member to separate the cover into a plurality of regions when the object detecting unit detects an object, and the driving unit leaves the separation member retracted from the position on the cover when the object detecting unit does not detect an object.

(2) The projection display device described in (1), wherein the opening portion has a shape whose longitudinal direction is a direction in which a driver's seat and a passenger seat of the vehicle are arranged, and the plurality of regions are arranged in the longitudinal direction.

(3) The projection display device described in (2), wherein the object detecting unit detects at least an object approaching a region except a region closest to the driver's seat among the plurality of regions.

(4) The projection display device described in (2) or (3), wherein the separation member is configured to be movable in a direction orthogonal to the direction in which the driver's seat and the passenger seat of the vehicle are arranged.

(5) The projection display device described in (1), wherein the separation member is configured to be movable in a direction in which a driver's seat and a passenger seat of the vehicle are arranged.

(6) The projection display device described in any one of (1) to (5), further including an object removing unit that removes the object adhered to the front surface of the cover in a state where the separation member has been moved to the position on the cover.

(7) The projection display device described in (6), wherein the driving unit retracts the separation member from the position on cover after the object removing unit completes removing the object.

(8) The projection display device described in any one of (1) to (7), further including a display control unit that causes a display device mounted in the vehicle to display an image that is based on light projected onto the projection surface from the region where the object is adhered in a state where the separation member has been moved to the position on the cover.

(9) The projection display device described in any one of (1) to (8), wherein the driving unit leaves the separation member retracted in a state where the image data that has been input to the light modulation unit includes data for displaying predetermined information and the object detecting unit has detected an object.

(10) An operation method for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a separation member that is movable and is for separating a front surface of the cover into a plurality of regions, the operation method including: an object detection step of detecting an object approaching the front surface of the cover; and a driving step of moving the separation member to a position on the cover and causing the separation member to separate the cover into a plurality of regions when the object detection step detects an object, and of leaving the separation member retracted from the position on the cover when the object detection step does not detect an object.

(11) The operation method for the projection display device described in (10), wherein the opening portion has a shape whose longitudinal direction is a direction in which a driver's seat and a passenger seat of the vehicle are arranged, and the plurality of regions are arranged in the longitudinal direction.

(12) The operation method for the projection display device described in (11), wherein the object detection step detects at least an object approaching a region except a region closest to the driver's seat among the plurality of regions.

(13) The operation method for the projection display device described in (11) or (12), wherein the separation member is configured to be movable in a direction orthogonal to the direction in which the driver's seat and the passenger seat of the vehicle are arranged.

(14) The operation method for the projection display device described in (10), wherein the separation member is configured to be movable in a direction in which a driver's seat and a passenger seat of the vehicle are arranged.

(15) The operation method for the projection display device described in any one of (10) to (14), further including an object removal step of removing the object adhered to the front surface of the cover in a state where the separation member has been moved to the position on the cover.

(16) The operation method for the projection display device described in (15), wherein the separation member is retracted from the position on cover after the object removal step is completed.

(17) The operation method for the projection display device described in any one of (10) to (16), further including a display control step of causing a display device mounted in the vehicle to display an image that is based on light projected onto the projection surface from the region where the object is adhered in a state where the separation member has been moved to the position on the cover.

(18) The operation method for the projection display device described in any one of (10) to (17), wherein the driving step leaves the separation member retracted in a state where the image data that has been input to the light modulation unit includes data for displaying predetermined information and the object detection step has detected an object.

(19) An operation program for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a separation member that is movable and is for separating a front surface of the cover into a plurality of regions, the operation program causing a computer to execute a driving step of moving the separation member to a position on the cover and causing the separation member to separate the cover into a plurality of regions when an object approaching the front surface of the cover is detected, and of leaving the separation member retracted from the position on the cover when the object is not detected.

The present invention is able to increase the product value of a vehicle when applied to the vehicle, such as an automobile.

REFERENCE SIGNS LIST 100, 100A, 100B HUD
1 automobile
2 windshield
3 housing
4 dashboard
5 control unit
6 diffusion member
7 concave mirror
8 connecting portion
9 cover
10 driving unit
11, 11A, 11B, 11C separation member
object detecting unit
12a light emitting element
12b light receiving element
13 object removing unit
14 discharge unit
20 display device 40 light source unit
41r R light source
41g G light source
41b B light source
42r, 42g, 42b collimator lens
43 dichroic prism
44 light modulation element
45 light modulation element driving unit
46 light source control unit
47 system control unit
90 driver-side region
91 passenger-side region
92, 93, 94, 95, 96 region
E eyes
K opening portion
D dust box
X, Y direction

What is claimed is:

1. A projection display device comprising:
    a light modulation unit that spatially modulates, in accordance with image data that is input, light emitted by a light source;
    a housing that accommodates the light modulation unit;
    a projection optical system that is accommodated in the housing and projects the light that has been spatially modulated onto a projection surface of a vehicle through an opening portion of the housing;
    a cover that closes the opening portion;
    a separation member that is movable and is for separating a front surface of the cover into a plurality of regions;
    a driving unit that drives the separation member; and
    an object detecting unit that detects an object approaching the front surface of the cover, wherein
    the driving unit moves the separation member to a position on the cover and causes the separation member to separate the cover into a plurality of regions when the object detecting unit detects an object, and the driving unit leaves the separation member retracted from the position on the cover when the object detecting unit does not detect an object, wherein
    the separation member is inserted to and retracted from the position on the cover in a same axial direction.

2. The projection display device according to claim 1, wherein
    the opening portion has a shape whose longitudinal direction is a direction in which a driver's seat and a passenger seat of the vehicle are arranged, and
    the plurality of regions are arranged in the longitudinal direction.

3. The projection display device according to claim 2, wherein
    the object detecting unit detects at least an object approaching a region except a region closest to the driver's seat among the plurality of regions.

4. The projection display device according to claim 2, wherein
    the separation member is configured to be movable in a direction orthogonal to the direction in which the driver's seat and the passenger seat of the vehicle are arranged.

5. The projection display device according to claim 3, wherein
    the separation member is configured to be movable in a direction orthogonal to the direction in which the driver's seat and the passenger seat of the vehicle are arranged.

6. The projection display device according to claim 1, wherein
    the separation member is configured to be movable in a direction in which a driver's seat and a passenger seat of the vehicle are arranged.

7. The projection display device according to claim 1, further comprising:
    an object removing unit that removes the object adhered to the front surface of the cover in a state where the separation member has been moved to the position on the cover.

8. The projection display device according to claim 7, wherein
    the driving unit retracts the separation member from the position on cover after the object removing unit completes removing the object.

9. The projection display device according to claim 1, further comprising:
    a display control unit that causes a display device mounted in the vehicle to display an image that is based on light projected onto the projection surface from the region where the object is adhered in a state where the separation member has been moved to the position on the cover.

10. The projection display device according to claim 1, wherein
    the driving unit leaves the separation member retracted in a state where the image data that has been input to the light modulation unit includes data for displaying predetermined information and the object detecting unit has detected an object.

11. An operation method for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a separation member that is movable and is for separating a front surface of the cover into a plurality of regions,
    the operation method comprising:
    an object detection step of detecting an object approaching the front surface of the cover; and
    a driving step of moving the separation member to a position on the cover and causing the separation member to separate the cover into a plurality of regions when the object detection step detects an object, and of leaving the separation member retracted from the position on the cover when the object detection step does not detect an object, wherein
    the separation member is inserted to and retracted from the position on the cover in a same axial direction.

12. The operation method for the projection display device according to claim 11, wherein
    the opening portion has a shape whose longitudinal direction is a direction in which a driver's seat and a passenger seat of the vehicle are arranged, and
    the plurality of regions are arranged in the longitudinal direction.

13. The operation method for the projection display device according to claim 12, wherein
    the object detection step detects at least an object approaching a region except a region closest to the driver's seat among the plurality of regions.

14. The operation method for the projection display device according to claim 12, wherein
the separation member is configured to be movable in a direction orthogonal to the direction in which the driver's seat and the passenger seat of the vehicle are arranged.

15. The operation method for the projection display device according to claim 11, wherein
the separation member is configured to be movable in a direction in which a driver's seat and a passenger seat of the vehicle are arranged.

16. The operation method for the projection display device according to claim 11, further comprising:
an object removal step of removing the object adhered to the front surface of the cover in a state where the separation member has been moved to the position on the cover.

17. The operation method for the projection display device according to claim 16, wherein
the separation member is retracted from the position on cover after the object removal step is completed.

18. The operation method for the projection display device according to claim 11, further comprising:
a display control step of causing a display device mounted in the vehicle to display an image that is based on light projected onto the projection surface from the region where the object is adhered in a state where the separation member has been moved to the position on the cover.

19. The operation method for the projection display device according to claim 11, wherein
the driving step leaves the separation member retracted in a state where the image data that has been input to the light modulation unit includes data for displaying predetermined information and the object detection step has detected an object.

20. A non-transitory computer readable recording medium storing an operation program for a projection display device having a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; a cover that closes the opening portion; and a separation member that is movable and is for separating a front surface of the cover into a plurality of regions,
the operation program causing a computer to execute:
a driving step of moving the separation member to a position on the cover and causing the separation member to separate the cover into a plurality of regions when an object approaching the front surface of the cover is detected, and of leaving the separation member retracted from the position on the cover when the object is not detected, wherein
the separation member is inserted to and retracted from the position on the cover in a same axial direction.

* * * * *